US005922263A

United States Patent [19]
Endo et al.

[11] Patent Number: 5,922,263

[45] Date of Patent: Jul. 13, 1999

[54] WATERPROOF CONNECTOR HOUSING AND METHOD OF PRODUCING SAME

[75] Inventors: Takayoshi Endo; Takeyuki Hamaguchi; Satoshi Yamada, all of Shizuoka, Japan

[73] Assignee: Yazaki Corporation, Tokyo, Japan

[21] Appl. No.: 08/601,986

[22] Filed: Feb. 15, 1996

Related U.S. Application Data

[30] Foreign Application Priority Data

Feb. 15, 1995 [JP] Japan .................................... 7-026653

[51] Int. Cl.[6] ........................... B29C 33/42; B29C 39/12; H01R 13/52

[52] U.S. Cl. .......................... 264/255; 264/273; 264/274; 264/275; 439/271; 439/278

[58] Field of Search .................................... 264/274, 273, 264/275, 255; 439/271, 278

[56] References Cited

U.S. PATENT DOCUMENTS 4,842,540 6/1989 Endo et al. ............................ 439/271

FOREIGN PATENT DOCUMENTS 3-219578 9/1991 Japan ........................................ 43/24

*Primary Examiner*—Catherine Timm
*Assistant Examiner*—Suzanne E. Mason
*Attorney, Agent, or Firm*—Morgan, Lewis & Bockius LLP

[57] ABSTRACT

A waterproof connector housing which directly mounts on a device includes a hood portion for fitting on a mating connector housing, an elastic seal ring provided inside the hood portion for forming a watertight seal between the waterproof connector housing and the mating connector housing, and an O-ring for forming a watertight seal for the device. The O-ring is located at the proximal end of the hood portion which is to face the device. The elastic seal ring and the O-ring are integrally formed with each other through disengagement prevention portions and connecting portions of the elastic seal ring. The disengagement prevention portions extend through the proximal end portion of the hood, and each of the connecting portions interconnect their respective disengagement prevention portions with the O-ring.

6 Claims, 4 Drawing Sheets

WATERPROOF CONNECTOR HOUSING AND METHOD OF PRODUCING SAME

BACKGROUND OF INVENTION

1. Field of the Invention

This invention relates to a waterproof connector housing which mounts directly on a device and a method of producing the same. The connector housing includes a hood portion for fitting on a mating connector housing, an elastic seal ring provided inside the hood portion for forming a watertight seal between the waterproof connector housing and the mating connector housing, and an O-ring located at the proximal end of the hood portion facing the device for forming a watertight seal for the device.

2. Discussion of the Related Art

One conventional method of producing a watertight connector housing is disclosed in Japanese Patent Unexamined Publication No. 3-219578. FIG. 4 shows a housing A similar to one produced by this conventional method. The housing A includes a hood portion 3 of an enlarged size formed through a step portion $\mathbf{2}_1$ on a housing body 1 for receiving a mating connector housing, and an elastic seal ring 4 integrated at a proximal end portion of the hood portion 3, that is, between the first step portion $\mathbf{2}_1$ and a second step portion $\mathbf{2}_2$. The elastic seal ring 4 has disengagement prevention portions 4*a,* and these disengagement prevention portions 4*a* fit snugly in through holes 2*a* formed through a proximal portion of the step portion $\mathbf{2}_1$.

A disengagement prevention step portion $\mathbf{2}a_1$ is formed on an inner surface of the through hole 2*a,* and is engaged with a disengagement prevention step portion 4*a,* of the associated disengagement prevention portion 4*a,* thereby preventing the elastic seal ring 4 from being disengaged when the mating connector housing is inserted and withdrawn. The housing body 1 has terminal receiving chambers 1*a* provided therein.

A method for producing the waterproof connector housing A similar to that disclosed in JP 3-219578 is described below. In a first step of the molding, the housing body 1 and the hood portion 3 are formed, and in a second step the elastic seal ring 4 is formed.

In the first step, an upper mold and a lower mold (both of which are not shown) are clamped together along the axis of the soon to be molded housing A, and the connector housing is injection molded using an ordinary method.

FIG. 5 shows the second step. An upper mold 6' and a lower mold 7', which has a cavity 9 corresponding to an elastic seal ring-forming portion, are clamped together, and an elastic material in the liquid state is introduced into the seal ring-forming portion (cavity 9) through a gate 8*a* of a runner 8, formed in the upper mold 6', and the through hole 2*a.*

In the first step, axial projections (not shown) are formed respectively on the first and second step portions $\mathbf{2}_1$ and $\mathbf{2}_2$, and a similar projection is formed on a peripheral portion disposed outwardly from the through holes 2*a* over an entire periphery thereof. When the upper and lower molds 6' and 7' are clamped together, these projections are compressed and crushed by the molds, and are held in intimate contact with the associated molds, thereby preventing the liquid elastic material of high fluidity from leaking.

In the above waterproof connector housing, no means are provided for forming a waterproof seal when the connector housing is directly mounted on a device. This type of connector housing will now be described with reference to FIGS. 6(*a*) to 6(*c*). FIG. 6(*a*) shows a type of connector housing which directly mounts on a device. A flange 2 is formed at a proximal end of a hood portion 3, and the flange 2 has through holes 2*d* for fastening screws for mounting the connector housing directly on the device. An O-ring receiving groove 2*c,* corresponding in size to an O-ring 5, is formed in the device-side surface of the proximal end of the hood portion 3. The depth of this O-ring receiving groove 2*c* is smaller than the thickness of the O-ring 5, and therefore the O-ring 5 is received in this O-ring receiving groove in such a manner that the O-ring 5 projects beyond the device-side surface of the proximal end of the hood portion 3. When this connector housing is fixedly secured to the device (see FIG. 6(*b*)), the O-ring is deformed to be held in intimate contact with the device, and prevents water from intruding through any gaps between the device and the connector housing.

An elastic seal ring 4 is provided inside the hood portion 3, and disengagement prevention portions 4*a* of this elastic seal ring fit snugly in through holes 2*a.* A step portion 4*a*1 of each disengagement prevention portion 4*a* is engaged with a step portion 2*a*1 on the inner surface of the associated through hole 2*a,* thereby preventing the elastic seal ring 4 from being disengaged.

In this type of connector housing which mounts directly on the device, the housing portion and the seal ring are molded in an integral manner, as described above, and although the disengagement of the seal ring is prevented by the disengagement prevention portions 4*a,* a few drawbacks have been encountered. First, when the molded product is removed from the mold, or the seal ring is disengaged out of position, the seal ring 4 may remain in the mold when disengaged (as indicated by an arrow in FIG. 6(*c*)) since the seal ring is made of an elastic material. In addition, the O-ring 5 is liable to be disengaged from the groove 2*c* as indicated by an arrow in FIG. 6(*c*). Therefore, when the waterproof connector housing is mounted on the device, it is necessary to confirm whether or not the O-ring 5 is in place, thus inviting a disadvantage due to the care that must be taken when handling the O-ring. Furthermore, the O-ring and the seal ring are produced separately from each other, thus undesirably increasing the cost.

SUMMARY OF THE INVENTION

The present invention has been made in view of the above circumstances and has an object of providing a waterproof connector housing in which disengagements of an elastic seal ring and an O-ring are prevented.

A further object of the present invention is to provide a method of producing such a waterproof connector housing easily and at a low cost.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the waterproof connector housing of the type for being mounted directly on a device, includes a hood portion for fitting on a mating connector housing, an elastic seal ring inside the hood portion for forming a watertight seal between the waterproof connector housing and the mating connector housing, an O-ring at the proximal end portion of the hood portion facing the device for forming a watertight seal with the device, at least one disengagement prevention portion integrated with and extending from the elastic seal ring through the proximal end portion of the hood portion facing the device, and at least one connecting portion integrally interconnected with its respective disengagement prevention portion and the O-ring.

In a method of producing a waterproof connector housing of the type for being mounted directly on a device according to the present invention, in a second step of the production, an elastic seal ring-forming area and disengagement prevention portion-forming areas are used as paths or passages for passing an elastic material, thereby molding the elastic seal ring, the O-ring, the disengagement prevention portions and connecting portions at the same time.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings.

FIG. 3(*b*) is a view showing a second stage of the production method;

FIG. 3(*c*) is a view showing a third stage of the production method;

FIG. 3(*d*) is a view showing a fourth stage of the production method;

FIG. 6(*b*) is a cross-sectional view of the conventional waterproof connector housing of the directly-mounting type mounted on the device; and FIG. 6(*c*) is a cross-sectional view of the conventional waterproof connector housing of the directly-mounting type, showing a problem.

DETAILED DESCRIPTION OF THE PREFERRED EMBODIMENTS

In the waterproof connector housing of the invention, the elastic seal ring inside the hood portion and the O-ring, both located at the proximal end portion of the hood which faces the device, are integrally connected with each other through the disengagement prevention portions of the elastic seal ring and the connecting portions connected to the O-ring. Due to this integration, after the molding process, the seal ring will not get caught by and remain in the mold. Further, the seal ring will not disengage when the mating connector housing is inserted or withdrawn, and the O-ring will not be disengaged out of position.

In the waterproof connector-producing method of the present invention, the O-ring and the elastic seal ring are simultaneously and integrally molded with each other, reducing the number of production steps as well as the parts required for the molding, thus decreasing the production costs.

Figure 1:
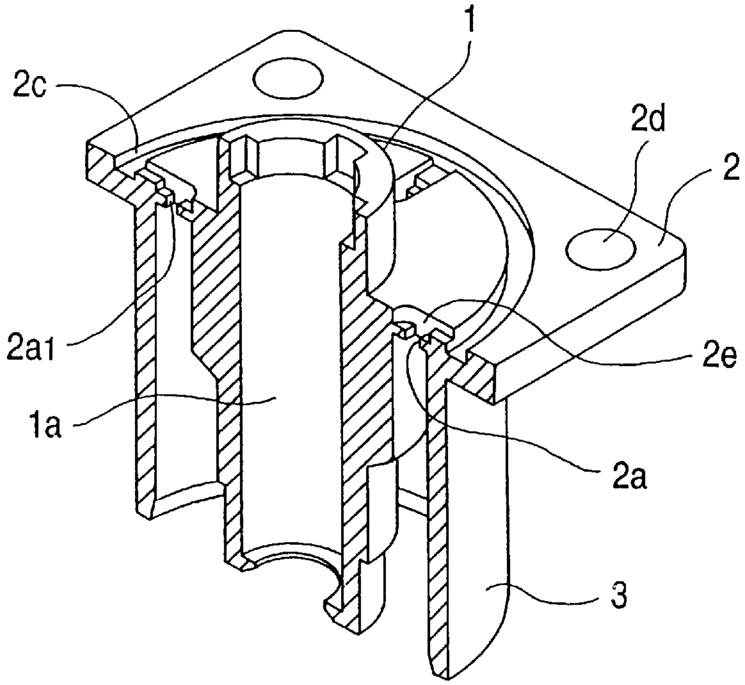
FIG. 1 is a perspective, cross-sectional view of a waterproof connector housing of the present invention, with an elastic seal ring and an O-ring omitted.
Figure 2:
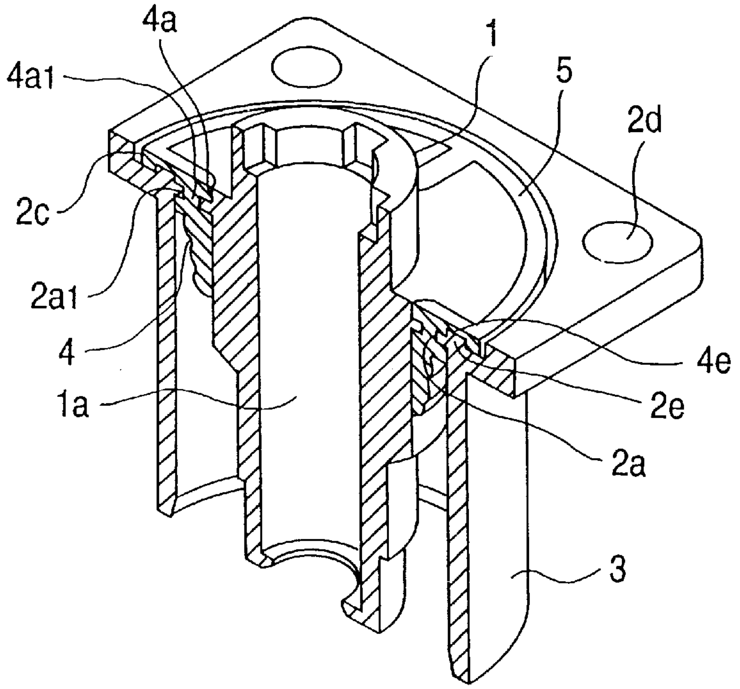
FIG. 2 is a perspective, cross-sectional view of the waterproof connector housing of the invention having the elastic seal ring and the O-ring.

FIG. 1 shows one embodiment of the present invention, and is a perspective, cross-sectional view showing a condition in which an elastic seal ring and an O-ring have not yet been formed. FIG. 2 is a perspective, cross-sectional view showing a condition after the elastic seal ring and the O-ring are molded. In the two Figures, reference numeral 1 denotes a housing body, and reference numeral 3 denotes a hood portion for fitting on a mating housing. Provided inside the hood portion 3 is the elastic seal ring 4 for forming a watertight seal between the connector housing and the mating housing. Disengagement prevention portions 4*a* of the elastic seal ring 4 extend through retaining holes 2*a,* formed in a proximal end portion of the hood portion 3. The disengagement prevention portions 4*a* extend to a device-side surface of the proximal end portion of the hood portion 3, and are integrally connected to the O-ring 5 through connecting portions 4*e.* The connecting portions 4*e* are received in connecting grooves 2*e.*

A step portion $\mathbf{4}a_1$ of each disengagement prevention portion 4*a* is fittingly engaged with a step portion $\mathbf{2}a_1$ formed on an inner surface of the associated through hole 2*a,* thereby helping prevent the elastic seal ring 4 from disengaging. The elastic seal ring 4 in the hood portion and the O-ring 5 disposed at the device-side portion of the hood proximal end portion are formed integrally with each other through the disengagement prevention portions 4*a* and connecting portions 4*e* of the elastic seal ring 4. Therefore, the seal ring 4 will not be caught by and remain in the mold, and the seal ring 4 will not disengage when the mating connector housing is inserted and withdrawn. In addition, the O-ring 5 will not disengage out of position.

The housing body 1 has terminal receiving chamber 1*a* therein. Retaining mechanisms required when terminals are received in the housing, and so on are not shown in the drawings.

Figure 3:
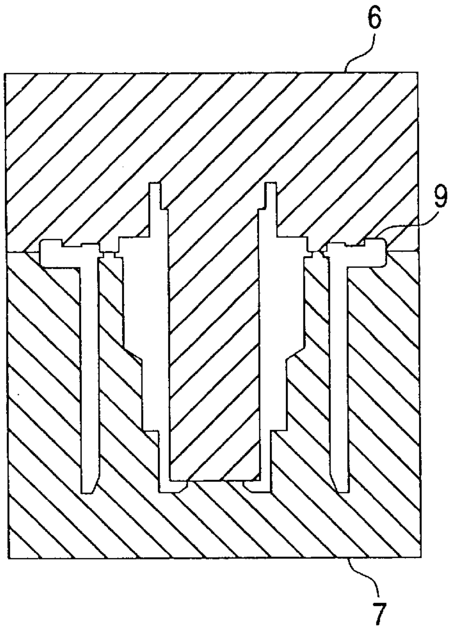
FIG. 3(*a*) is a view showing a first stage of a method of producing the waterproof connector housing of the invention.
Figure 3:
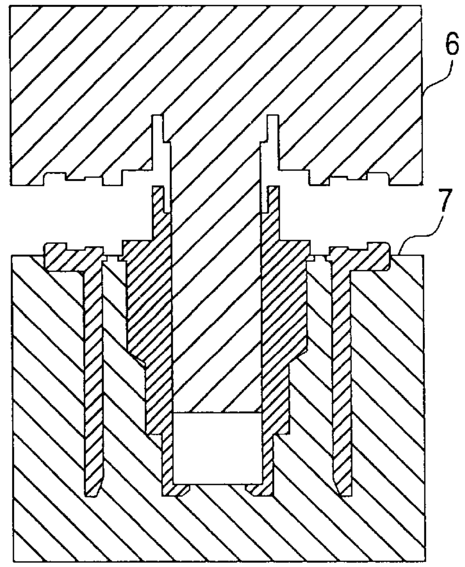
Figure 3:
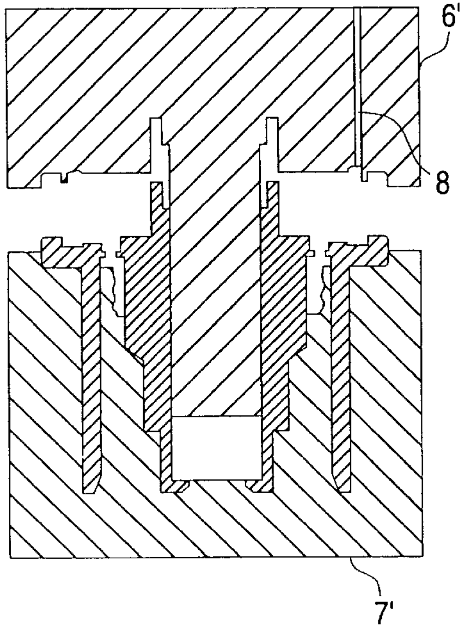
Figure 3:
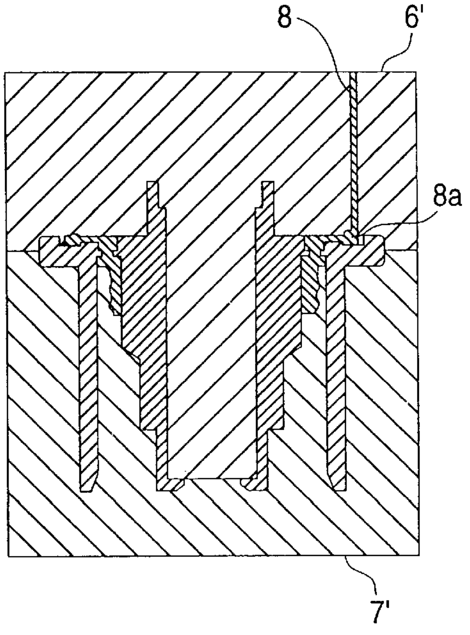
Figure 4:
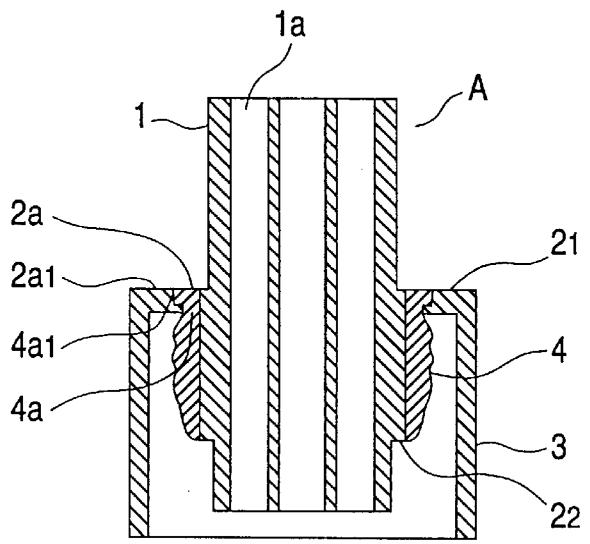
FIG. 4 PRIOR ART
FIG. 4 is a cross-sectional view of a conventional waterproof connector housing A.
Figure 5:
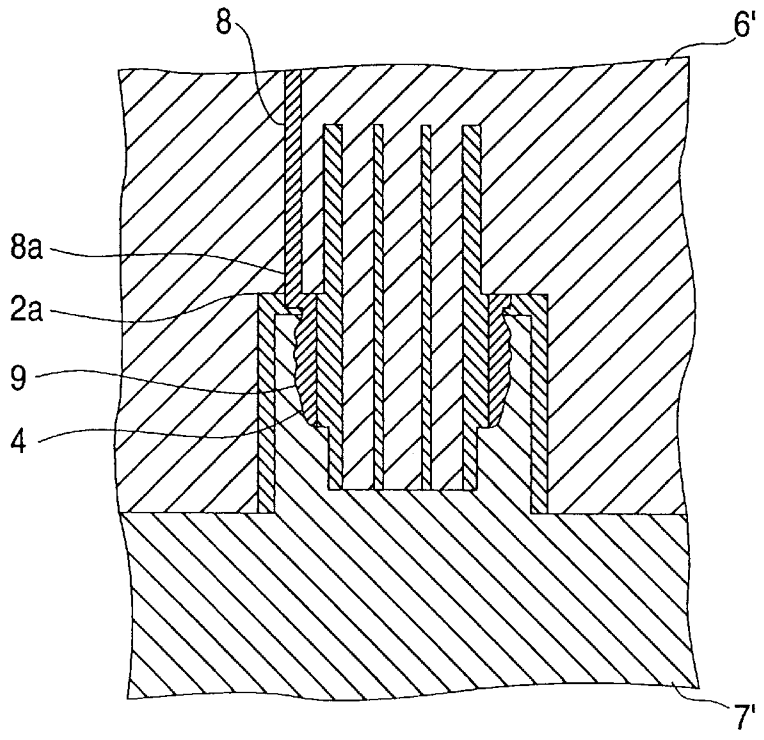
FIG. 5 PRIOR ART
FIG. 5 is a cross-sectional view showing molds and the housing in the secondary molding of the conventional waterproof connector housing A.
Figure 6:
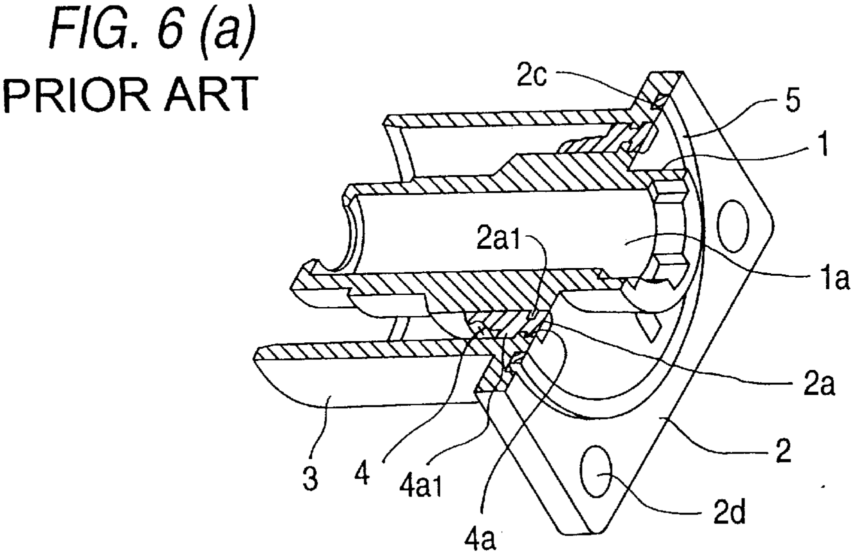
FIG. 6 (a) PRIOR ART
FIG. 6(*a*) is a perspective, cross-sectional view of a conventional waterproof connector housing which mounts directly on a device.
Figure 6:
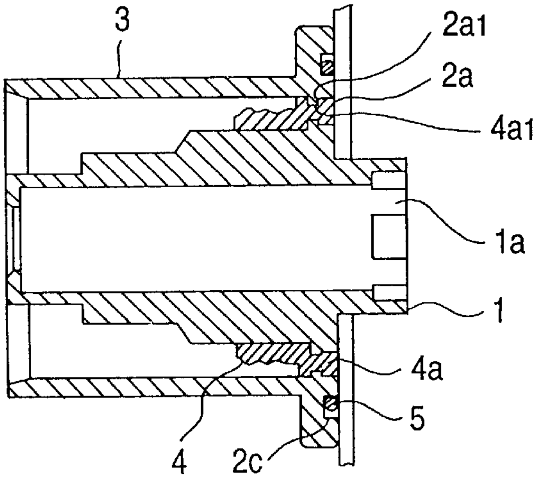
FIG. 6 (b) PRIOR ART
Figure 6:
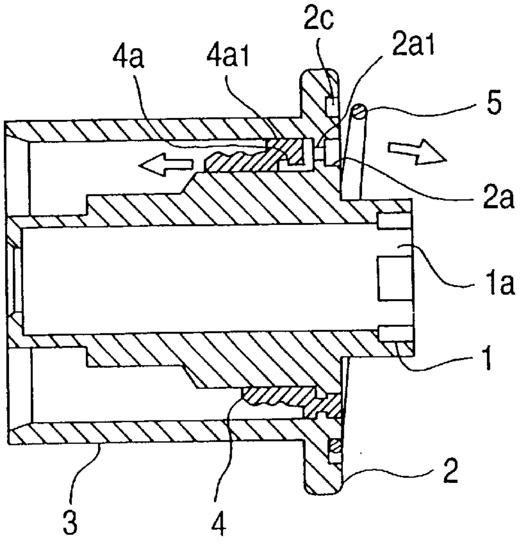
FIG. 6 (c) PRIOR ART

This connector housing can be produced as shown in FIGS. 3(*a*) to 3(*d*). FIGS. 3(*a*) to 3(*d*) are cross-sectional views showing molds and an intermediate product at a sequence of steps of a molding method. A first step of the molding comprises a first stage and a second stage, and a second step comprises a third stage and a fourth stage.

First, as shown in FIG. 3(*a*), the upper and lower molds 6 and 7 for molding the connector housing are clamped together to form a cavity 9 (the first stage).

Then, a resin is introduced into the cavity 9 through a runner (not shown) to mold the housing body and the hood portion integrally with each other (the second stage). FIG. 3(*b*) shows a condition in which the upper mold 6 is removed.

Thereafter, as shown in FIG. 3(*c*), the upper and lower molds 6 and 7 are replaced by the upper mold 6' and the lower mold 7' for molding the elastic seal ring and the O-ring, and the latter molds are clamped together (the third stage).

FIG. 3(*d*) shows the fourth stage, where a material such as silicone rubber in a liquid state is introduced into an O-ring molding portion through a gate 8*a* of a runner 8 formed in the upper mold 6'. It is further fed into an elastic seal ring-forming area via connecting portion-forming areas and disengagement prevention portion-forming areas, thereby molding the elastic seal ring, the O-ring, the disengagement prevention portions and the connecting portions in an integral manner, as shown in FIG. 3(*d*).

Finally, the runner connected to the O-ring is cut off, thus completing the production of an embodiment of the waterproof connector housing of the present invention.

Another possible method of producing this connector housing uses an arrangement in which a runner connected to the elastic seal ring-forming portion is formed in the lower mold 7'. The soft material such as liquid silicone rubber is fed through this runner, and is further fed into the O-ring molding portion via the disengagement prevention portion-forming portions and the connecting portion-forming portions, thereby molding the elastic seal ring, the O-ring, the disengagement prevention portions and the connecting portions in an integral manner.

As described above, in the waterproof connector housing of the present invention, the seal ring will not remain in the mold after the molding, and will not disengage when the mating connector housing is inserted or withdrawn. Further, the O-ring, which forms a watertight seal between the housing and the device, will not be disengaged out of position.

In the production method of the present invention, the O-ring and the elastic seal ring are molded integrally with each other at the same time. The number of production steps as well as the parts required for the molding are decreased, thereby reducing the production costs.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of producing a waterproof connector housing which directly mounts on a device and receives a mating connector housing, the method comprising the steps of:

integrally molding a housing body with a surrounding hood portion, the hood portion defining an elastic seal ring-forming area and an O-ring molding area connected with each other via connecting portion-forming areas, the O-ring molding area being defined in a substantially planar surface of the housing body;

feeding a soft material into the O-ring molding area where the soft material then flows into the elastic seal ring-forming area via the connecting portion-forming areas and then into disengagement prevention portion-forming areas to form an O-ring and an elastic seal ring that are integrally molded together, the O-ring and the elastic seal ring providing waterproof seals when the waterproof connector housing is mounted on the device and receives the mating connector housing.

2. A method of producing a waterproof connector housing which directly mounts on a device and receives a mating connector housing, the method comprising the steps of:

integrally molding a housing body with a surrounding hood portion, the hood portion defining an elastic seal ring-forming area and an O-ring molding area connected with each other via connecting portion-forming areas, the O-ring molding area being defined in a substantially planar surface of the housing body;

feeding a soft material into the elastic seal ring-forming area where the soft material then flows into disengagement prevention portion-forming areas and then into the connecting portion-forming areas, and finally into the O-ring molding area to form an elastic seal ring and an O-ring that are integrally molded together, the O-ring and the elastic seal ring providing waterproof seals when the waterproof connector housing is mounted on the device and receives the mating connector housing.

3. The method of producing a waterproof connector housing which directly mounts on a device and receives a mating connector housing as set forth in claim 1, wherein a top face of the O-ring is formed having a flat surface.

4. The method of producing a waterproof connector housing which directly mounts on a device and receives a mating connector housing as set forth in claim 2, wherein a top face of the O-ring is formed having a flat surface.

5. The method of producing a waterproof connector housing which directly mounts on a device and receives a mating connector housing as set forth in claim 1, wherein the O-ring is disposed to form a seal between the waterproof connector housing and the device, and the elastic seal ring is disposed to form a seal between the waterproof connector housing and the mating connector.

6. The method of producing a waterproof connector housing which directly mounts on a device and receives a mating connector housing as set forth in claim 2, wherein the O-ring is disposed to form a seal between the waterproof connector housing and the device, and the elastic seal ring is disposed to form a seal between the waterproof connector housing and the mating connector.

* * * * *